(12) United States Patent
Rieger

(10) Patent No.: US 9,457,958 B2
(45) Date of Patent: Oct. 4, 2016

(54) DEFLECTION DEVICE FOR A BELT CONVEYOR COMPRISING AN ENDLESS CONVEYOR BELT

(71) Applicant: SANDVIK IMINING AND CONSTRUCTION MATERIALS HANDLING GMBH & CO KG, Loeben (AT)

(72) Inventor: Hubert Rieger, Loeben (AT)

(73) Assignee: SANDVIK MINING AND CONSTRUCTION MATERIALS HANDLING GMBH & CO KG, Loeben (AT)

( * ) Notice: Subject to any disclaimer, the term of this patent is extended or adjusted under 35 U.S.C. 154(b) by 0 days.

(21) Appl. No.: 14/894,511

(22) PCT Filed: May 13, 2014

(86) PCT No.: PCT/EP2014/059713
§ 371 (c)(1),
(2) Date: Nov. 28, 2015

(87) PCT Pub. No.: WO2014/191195
PCT Pub. Date: Dec. 4, 2014

(65) Prior Publication Data
US 2016/0114979 A1    Apr. 28, 2016

(30) Foreign Application Priority Data
May 28, 2013  (AT) .................. A 442/2013

(51) Int. Cl.
*B65G 15/60*  (2006.01)
*B65G 37/00*  (2006.01)

(52) U.S. Cl.
CPC ............... *B65G 15/60* (2013.01); *B65G 37/00* (2013.01)

(58) Field of Classification Search
CPC ............................. B65G 15/62; B65G 15/64
USPC ................... 198/839, 588, 812, 313
See application file for complete search history.

(56) References Cited

U.S. PATENT DOCUMENTS

| 2,733,806 A | 2/1956 | Lanier |
| 3,016,127 A | 1/1962 | Cooper |
| 3,251,455 A | 5/1966 | Lorvi |
| 3,253,698 A * | 5/1966 | Murphy ................. B65G 15/60 198/637 |
| 4,986,413 A * | 1/1991 | Mraz ..................... B65G 15/04 198/839 |
| 5,421,449 A | 6/1995 | Coxon |
| 6,145,653 A * | 11/2000 | Mensch ................. B65G 15/60 198/837 |
| 6,886,681 B2 * | 5/2005 | Nolan ................... B65H 20/06 198/405 |

FOREIGN PATENT DOCUMENTS

| DE | 2260718 A1 | 7/1973 | |
| DE | 3347855 C2 | 12/1986 | |
| FR | 641399 | * 8/1928 | ............. B65G 15/62 |
| GB | 561551 A | 5/1944 | |
| JP | H1149325 A | 2/1999 | |
| JP | 2000168929 A | 6/2000 | |

* cited by examiner

*Primary Examiner* — James R Bidwell
(74) *Attorney, Agent, or Firm* — Corrine R. Gorski

(57) ABSTRACT

A deflection device for a belt conveyor includes an endless conveyor belt for the deflection of the conveyor belt between a first stretch section and a second stretch section running transversely thereto. The deflection device includes at least one turning device and a second turning device for the conveyor belt. The first and second turning devices are arranged in a region of a bottom strand of the conveyor belt and wherein each turning device includes at least one vertical deflection roller for the conveyor belt, in order to turn the conveyor belt from a horizontal plane into a vertical plane.

14 Claims, 3 Drawing Sheets

DEFLECTION DEVICE FOR A BELT CONVEYOR COMPRISING AN ENDLESS CONVEYOR BELT

RELATED APPLICATION DATA

This application is a §371 National Stage Application of PCT International Application No. PCT/EP2014/054713 filed May 13, 2014 claiming priority of AT Application No. A 442/2013, filed May 28, 2013.

FIELD OF THE INVENTION

The invention relates to a deflection device for a belt conveyor having an endless conveyor belt, for deflecting the conveyor belt between a first stretch section and a second stretch section running transversely to the first stretch section, the deflection device including at least one first turning device and a second turning device for the conveyor belt.

The invention further relates to a conveyor belt system having a first belt conveyor which in turn has an endless conveyor belt, and a second belt conveyor, wherein the first belt conveyor includes a transport section in a first stretch section and the second belt conveyor is arranged in a second stretch section running transverse to the first stretch section, and at the end of the transport section of the first belt conveyor a material transfer station is provided for transferring material onto the second belt conveyor.

BACKGROUND OF THE INVENTION

With what is known as the room-and-pillar method, first a main stretch is excavated ("development"), the width of which corresponds essentially to the width of the roadheading machine. This is followed by mining outwards laterally from the main stretch to form chambers ("retreat mining"). In the retreat mining phase, the supporting of the cavity areas by installed elements is done without. Instead, the material is mined out of chambers, and pillars of rock or coal are left standing respectively in order to support the roof. Taking account of the pillars which are left standing in each case, the conveying means provided for conveying away the mined material must overcome frequent changes of direction and tight curve radii. In the roadway/stretch it is possible, at a point located further back, for a conventional conveying means to be arranged, for example in the form of stationary conveying belts installed subsequently. In order to allow transport from the actual point of excavation and working to a stationary conveying means even with tight curves of this type, it has already been proposed that what are referred to as "shuttle" vehicles are used, which transport the material from the roadheading machine to the stationary conveying device arranged further back in the roadway.

As an alternative to "shuttle" vehicles, the principle is also known of guiding the conveyor belt as far as directly behind the excavating equipment, and continually moving it forwards in step with the development. For this purpose, the conveying device is in most cases formed of at least two different types of conveying elements, namely of a plurality of stationary conveyor elements which can be coupled to one another in order to form one stationary conveying device, and a plurality of movable conveying elements. The movable conveying elements can in this situation be drawn along immediately behind the excavating equipment, and form a continuously extendible conveying section. The gap which is thereby formed between the conveying elements being drawn behind and the stationary elements can be bridged by the introduction of additional conveying elements. In order to avoid interruptions in the operation of conveying material away, conveyor belt stores are known, which store the conveyor belt in a multiple folded compressed state, and from which a reserve length of conveyor belt can be drawn out.

Due to the change of direction of the conveying stretch, the endless conveyor belt, in particular with the room-and-pillar method, must be deflected between a first stretch section and a second stretch section running transversely to the first stretch section. The deflection can, as shown, for example, in DE 3347855 C2, take place without the ejection of material. As a rule, however, a material handover takes place between the first stretch section and the second stretch section running transversely to the first stretch section. The material handover can take place in this situation at an angle station with integrated belt deflection, as is described in U.S. Pat. No. 3,016,127 or WO 93/06028, wherein the material handover takes place on the same conveyor belt. The material handover can also take place onto a separate conveyor belt, which runs in the stretch section running transversely. A deflection device is only required in such a case if, as is frequently provided for with the room-and-pillar method, in this case transversely running main stretch is arranged relative to the belt store of the continuously developing belt conveyor.

Deflection devices comprise at least one first turning device and a second turning device for the conveyor belt. The first and second turning devices comprise, at an angle station (see, for example, U.S. Pat. No. 3,016,127), in each case a plurality of horizontal deflection rollers for the conveyor belt, wherein in each case at least one deflection roller encloses an angle of 45° with the direction of movement of the belt.

A disadvantage with conventional deflection devices is that an exact and elaborate method of guiding the conveyor belt is required. As well as this, conventional deflection devices are not flexible in use, since they are mostly designed for a predetermined deflection angle of, for example, 90°. Minor deviations from the predetermined deflection angle lead to imprecise belt guidance and to the risk of frequent operational interruptions.

SUMMARY

The object of the invention is therefore to provide a deflection device of the type referred to in the introduction, with which the deflection of the conveyor belt can be implemented in a space-saving manner, and which is universally usable, i.e. can overcome different deflection angles without major conversion work.

To solve this object, the invention makes provision, with a deflection device of the type referred to heretofore, essentially that the first and second turning devices are arranged in the region of the bottom strand, and comprise at least one vertical deflection roller for the conveyor belt respectively, in order to turn the conveyor belt from a horizontal into a vertical plane. Due to the fact that the conveyor belt, as a departure from conventional designs, does not remain in a horizontal plane, but is turned into a vertical plane, the conveyor belt can be aligned almost at will, such that, with one deflection device, the most widely varying deflection angles can be achieved. In this situation, only the angle of contact/enlacement of the at least one vertical deflection roller changes, but this does not impair the stable guidance of the belt. The first and the second turning devices are, according to the invention, arranged in the region of the bottom strand, i.e. in that section of the conveyor belt which does not carry the transported or bulk material. The bottom strand is therefore that conveyor belt section which is arranged downstream of a material handover.

In order to rotate the conveyor belt back into the horizontal position after the turn into the vertical plane, provision is made preferably for a third and a fourth turning device, which respectively comprise at least one vertical deflection roller for the conveyor belt, in order to turn the conveyor belt from a vertical into a horizontal plane. In this situation, the first and the second turning devices are preferably arranged in the first stretch section and the third and fourth turning devices preferably in the second stretch section.

The conveyor belt is therefore preferably turned twice in the first stretch section and in the second stretch section. In order to ensure good belt guidance in the sections in which the conveyor belt is turned in each case, the arrangement is preferably such that the first, second, third and/or fourth turning devices comprise a horizontal guide roller, wherein, between the at least one vertical deflection roller and the horizontal guide roller of each turning device, a turning section is arranged in which the conveyor belt is turned from a horizontal plane into a vertical plane.

Due to the fact that the conveyor belt is turned in the deflection device into a vertical plane, the transport of material through the deflection device is rendered difficult. Accordingly, a material transfer station is preferably provided, in order to transfer material from the conveyor belt' section accommodating the bulk material and running in the first stretch section onto a separate conveying device arranged in the second stretch section. The material transfer takes place in this situation preferably before the conveyor belt runs through the horizontal guide roller of the first turning device, in order to keep the region of the material transport free of belt rotations or turns.

A particularly space-saving arrangement is formed if, as derives from a preferred further embodiment, the first and the second turning devices are arranged behind one another seen in the conveying direction. "Behind one another" does not mean, in this context, that the conveyor belt runs through the first and second turning devices one after another (which necessarily is the case), but rather that a locational position of the two turning devices is determined which is independent of the belt course.

The third and the fourth turning devices, by contrast, can be arranged above one another, which is of particular advantage if a belt store is connected to the third and fourth turning devices, so that the entry into and exit from the belt store does not take place offset.

In order to allow for the most space-saving arrangement of the vertical deflection rollers with an arrangement of the first and second turning devices behind one another, provision is preferably made for the at least one vertical deflection roller of the first turning device and the at least one vertical deflection roller of the second turning device to be rotatably mounted in a common, preferably movable first frame. The mobility of the first frame in this situation allows, in a simple manner, for the joint adjustment of the vertical deflection rollers of the first and the second turning devices. Additionally, a flexibly applicable module is provided with the first frame, which facilitates the subsequent re-equipping of existing conveying devices. The module can in this situation be arranged in an existing conveying stretch in a simple manner between two existing conveyor belt support units. In order to obtain support for the top strand of the endless conveyor belt, guided over the first frame, in the region of the vertical deflection roller, provision is preferably made for the first frame to carry a belt guidance device, in particular carrier roller for the top strand running in a horizontal plane.

In order to be able to achieve a modular arrangement with the third and fourth turning devices also, a preferred embodiment makes provision for the at least one vertical deflection roller of the third turning device and the at least one vertical deflection roller of the fourth deflection device to be rotatably mounted in a common second frame. The deflection rollers referred to of the second frame provide for the deflection of the conveyor belt between the first stretch section and the second stretch section running transverse to the first stretch section. If, as corresponds to a preferred further embodiment, the second frame can optionally be added onto the right or left side of a belt guide device of the first stretch section, it is possible in a simple manner to switch between a belt deflection to the left and a belt deflection to the right.

In order to place the first and the third as well as the second and the fourth turning device better spatially separated from one another, an intermediate roller can be provided between them, preferably in each case. Advantageously, the first turning device includes for this purpose two vertical deflection rollers, in order to deflect the conveyor belt twice by essentially 90°. Likewise, the second turning device preferably includes for this purpose two vertical deflection rollers, in order to deflect the conveyor belt twice by essentially 90°.

The deflection station according to the invention can, as already indicated, be used in different ways in a conveyor belt system, for example with/at stretches which are excavated using the room-and-pillar method, wherein a stationary conveyor belt system is arranged in a main stretch, and, on a stretch which is being excavated within the framework of the retreat mining technique, a continuously reconstructable and extendible conveyor belt system is arranged, the belt store of which is positioned next to the stationary conveyor belt system in the main stretch. The conveyor belt system is in this connection arranged, according to a second aspect of the invention, in such a way that it comprises a first belt conveyor having an endless conveyor belt, and a second belt conveyor, wherein the first belt conveyor includes a transport section in a first stretch section, and the second belt conveyor is arranged in a second stretch section running transversely to the first stretch section, and, at the end of the transport section of the first belt conveyor, a material transfer station is provided for transferring material onto the second belt conveyor, wherein the first belt conveyor has a deflection station as described heretofore, which connects the transport section arranged in the first stretch section with a belt store arranged in the second stretch section.

The invention is described in greater detail hereinafter on the basis of exemplary embodiments schematically represented in the drawings.

DETAILED DESCRIPTION

Figure 1:
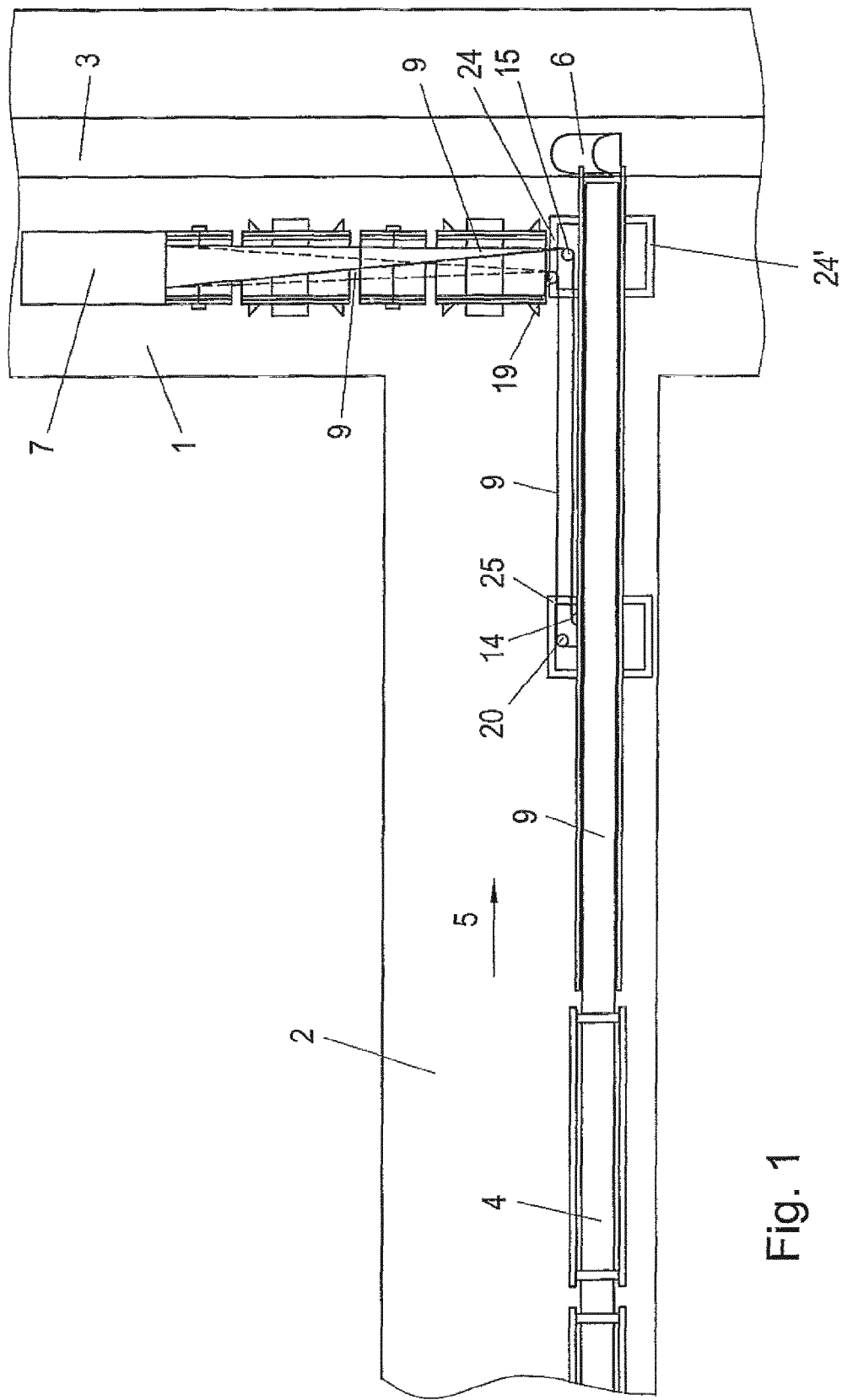
FIG. 1 shows a section of a conveyor belt system, together with the deflection device according to the invention.

Shown in FIG. 1 is the main stretch of a seam being excavated in accordance with the room-and-pillar method, designated by 1. A side stretch 2, which is being excavated within the framework of retreat mining, leads away from the main stretch 1 to the side at an angle of approximately 90°. In the main stretch 1 runs a stationary stretch conveyor means, arranged as a belt conveyor 3. In the side stretch 2 runs a conveyor device, likewise arranged as a belt conveyor 4, by means of which excavated material is transported in the direction of the arrow 5 in the direction towards the stationary belt conveyor 3. For transferring the material from the belt conveyor 4 onto the belt conveyor 3, a material transfer station 6 is provided.

Figure 2:
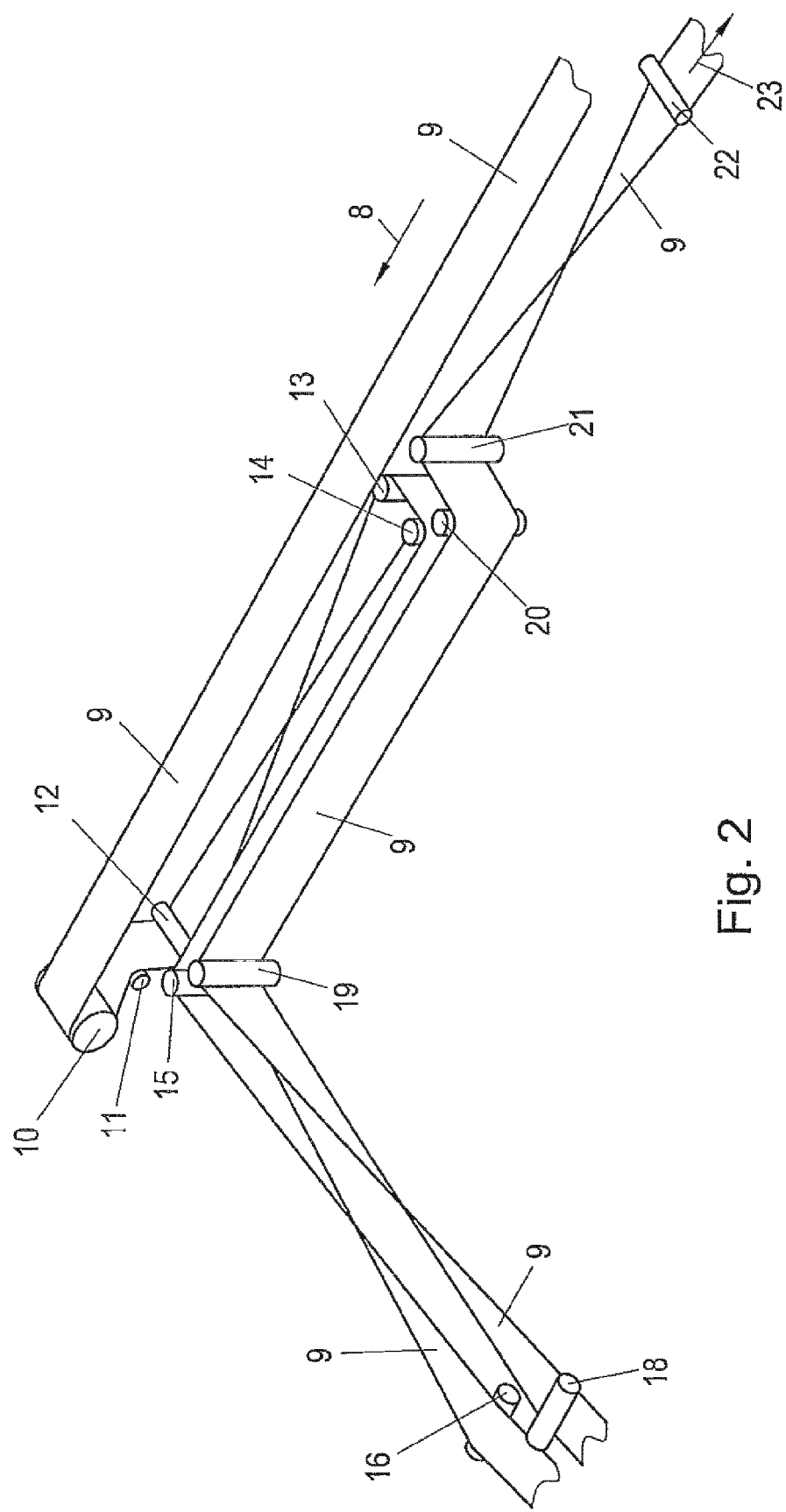
FIG. 2 shows a representation of the course of the conveyor belt at the deflection device from FIG. 1.

In the present example, the belt conveyor 4 is arranged as a continuously reconstructable stretch conveying means, which can be continuously developed or extended in accordance with the mining progress of the mining equipment, not shown. In order to allow for the extension of the conveyor stretch, the belt conveyor 4 is provided with a conveyor belt store 7 arranged for reasons of space in the main stretch 1. In order to deflect the conveyor belt of the belt conveyor 4 running in the side stretch 2 into the belt store 7 arranged in the main stretch 1, a deflection device is provided, with which the endless conveyor belt of the belt conveyor 4 can be deflected by essentially 90°. The deflection device has a plurality of deflection rollers, by means of which the endless conveyor belt, as represented in greater detail in FIG. 2, is deflected several times and is turned or rotated from a horizontal plane into a vertical plane and back again into a horizontal plane.

The belt conveyor 4 includes a section arranged in the side stretch 2, in which the conveyor belt takes up the bulk material and moves it onwards in the direction of the arrow 8. The conveyor belt 9 is deflected in the region of the transfer station 6 by means of a horizontal deflection roller 10 by 180°. After a further deflection by means of the horizontal deflection roller 11, the conveyor belt 9 reaches the first turning device, which is formed from the horizontal deflection roller 12 and the vertical deflection roller 13.

Formed between the horizontal deflection roller 12 and the vertical deflection roller 13 is a turning section, in which the conveyor belt 9 is turned or rotated by 90° from a horizontal plane into a vertical plane. The onward transport of the conveyor belt is in the horizontal alignment of the conveyor belt 9 about a further vertical deflection roller 14, in which the conveyor belt is brought back into the direction towards the main stretch 1 by means of a further 90° deflection.

At that point the conveyor belt 9 reaches the third turning device, which includes the vertical deflection roller 15 and the horizontal guide roller 16. Arranged between the vertical deflection roller 15 and the horizontal guide roller 16 is in turn a turning section, in which the conveyor belt 9 is turned back from a vertical plane into the horizontal plane. At the same time, by means of the vertical deflection roller 15, a deflection of the conveyor belt 9 from the side stretch 2 into the main stretch 1 takes place.

After the horizontal guide roller 16, the conveyor belt 9 is guided into a belt store 7, not shown in FIG. 2 for ease of overview. The conveyor belt 9 leaves the belt store 7 and is first guided over the horizontal guide roller 18. The conveyor belt 9 then reaches the fourth turning device, which includes the horizontal guide roller 18 and the vertical deflection roller 19, between which a turning section is arranged, in which the conveyor belt 9 is turned or rotated from a horizontal plane into a vertical plane. The vertical deflection roller 19 serves to deflect the horizontal conveyor belt 9 by 90°, as a result of which it is deflected from the main stretch 1 back into the side stretch 2.

By means of the further vertical deflection roller 20, the conveyor belt 9 is guided back into the alignment of the transport stretch of the main stretch 1. The conveyor belt 9 thereby reaches the second turning device, which is formed from the vertical deflection roller 21 and the horizontal guide roller 22, between which, in turn, a turning section is arranged, in which the conveyor belt 9 is rotated back out of the vertical plane into the horizontal plane. After the guide roller 22, the conveyor belt 9 is moved further in the direction of the arrow 23 and, as can be seen in FIG. 1, is located beneath the section accommodating the bulk material of the conveyor belt 9 and parallel to it.

The vertical deflection rollers 15 and 19 of the third and fourth turning devices are, as can be seen in FIG. 1, rotatably mounted in a frame 24, wherein the frame 24, as indicated in FIG. 1, can be arranged either on the right side of the belt conveyor 4, or, as indicated by 24', can be arranged on the left side. The positioning on the left side (24') would be necessary if the belt store 7 were positioned in the main stretch 1 on the other side of the belt conveyor 4.

Figure 3:
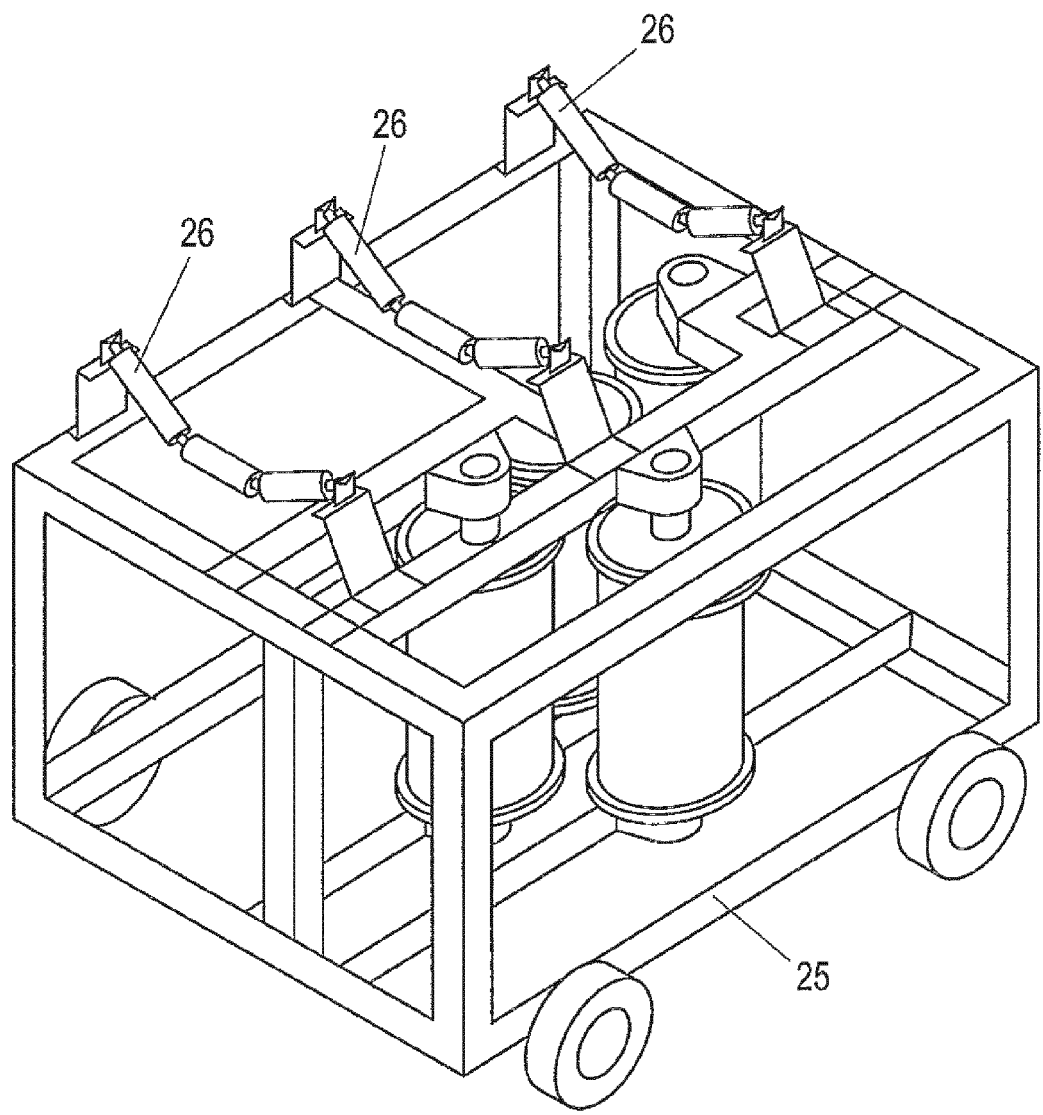
FIG. 3 shows a frame with deflection rollers used in the deflection device according to FIG. 1.

The vertical deflection rollers 13, 14, 20 and 21 of the first and second turning devices are, as can be seen in particular in FIG. 3, rotatably arranged in a common movable frame 25, wherein the frame includes a plurality of support rollers 26 for the conveyor belt 9, moving onwards in the direction of the arrow 8.

The invention claimed is:

1. A deflection device for a belt conveyor having an endless conveyor belt, for deflecting the conveyor belt between a first stretch section and a second stretch section running transversely to the first stretch section, the deflection device comprising:
   at least one first turning device for the conveyor belt;
   a second turning device for the conveyor belt, wherein the first and the second turning devices are arranged in a region of a bottom strand of the conveyor belt and each include at least one vertical deflection roller for the conveyor belt arranged to turn the conveyor belt from a horizontal plane into a vertical plane or, from a vertical plane into a horizontal plane; and
   a material transfer station arranged to transfer material from the section of the conveyor belt accommodating the bulk material and running in the first stretch section, onto a separate conveyor device arranged in the second stretch section.

2. The deflection device according to claim 1, further comprising a third and a fourth turning devices, each including at least one vertical deflection roller for the conveyor belt arranged to turn the conveyor belt from a vertical plane into a horizontal plane or, from a horizontal plane into a vertical plane.

3. The deflection device according to claim 2, wherein the first and the second turning devices are arranged in the first stretch section and the third and the fourth turning devices are arranged in the second stretch section.

4. The deflection device according to claim 2, wherein the first, second, third, and/or fourth turning devices include a horizontal guide roller, wherein, between the at least one vertical deflection roller and the horizontal guide roller of a respective turning device, a turning section is arranged, in which the conveyor belt is turned out of a horizontal plane into a vertical plane.

5. The deflection device according to claim 1, wherein the first and the second turning devices are arranged one behind another, seen in the conveying direction.

6. The deflection device according to claim 2, wherein the third and the fourth turning devices are arranged at least partially above one another.

7. The deflection device according to claim 2, wherein a belt store connects to the third and fourth turning devices.

8. The deflection device according to claim 1, wherein the at least one vertical deflection roller of the first turning device and the at least one vertical deflection roller of the second turning device are rotatably mounted in a common, preferably movable first frame.

9. The deflection device according to claim 8, wherein the first frame carries a belt guide device having support rollers for the section of the conveyor belt, which section accommodating the bulk material.

10. The deflection device according to claim 9, wherein the at least one vertical deflection roller of the third turning device and the at least one vertical deflection roller of the fourth turning device are rotatably mounted in a common second frame.

11. The deflection device according to claim 10, wherein the second frame can be attached on the right side or the left side of a belt guide device of the first stretch section.

12. The deflection device according to claim 1, wherein the first turning device includes two vertical deflection rollers arranged to deflect the conveyor belt twice by an angle of essentially 90°.

13. The deflection device according to claim 1, wherein the second turning device includes two vertical deflection rollers arranged to deflect the conveyor belt twice by an angle of essentially 90°.

14. A conveyor belt system comprising:
a first belt conveyor including an endless conveyor belt;
a second belt conveyor, wherein the first belt conveyor includes a transport section in a first stretch section, the second belt conveyor being arranged in a second stretch section running transverse to the first stretch section;
a material transfer station provided at the end of the transport section of the first belt conveyor for transferring material onto the second belt conveyor; and
a deflection station provided in the first belt conveyor, the deflection station connecting the transport section arranged in the first stretch section with a belt store of the first belt conveyor, the belt store being arranged in the second stretch section, the deflection station including at least one first turning device and a second turning device for the conveyor belt, wherein the first and the second turning devices are arranged in a region of a bottom strand of the conveyor belt and each includes at least one vertical deflection roller for the conveyor belt arranged to turn the conveyor belt from a horizontal plane into a vertical plane or, from a vertical plane into a horizontal plane.

* * * * *

UNITED STATES PATENT AND TRADEMARK OFFICE
CERTIFICATE OF CORRECTION

PATENT NO. : 9,457,958 B2  
APPLICATION NO. : 14/894511  
DATED : October 4, 2016  
INVENTOR(S) : Hubert Rieger Page 1 of 1

It is certified that error appears in the above-identified patent and that said Letters Patent is hereby corrected as shown below:

On the Title Page

Item (71) Applicant should read:
SANDVIK MINING AND CONSTRUCTION MATERIALS HANDLING GMBH & CO KG Signed and Sealed this
Tenth Day of January, 2017

Michelle K. Lee
*Director of the United States Patent and Trademark Office*